United States Patent
Vignesoult et al.

(10) Patent No.: US 6,284,684 B1
(45) Date of Patent: Sep. 4, 2001

(54) MINERAL WOOL COMPOSITION

(75) Inventors: Serge Vignesoult; Fabrice Lafon, both of Paris; Jean-Luc Bernard, Clermont, all of (FR)

(73) Assignee: Isover Saint Gobain, Courbevoie (FR)

( * ) Notice: Subject to any disclaimer, the term of this patent is extended or adjusted under 35 U.S.C. 154(b) by 0 days.

(21) Appl. No.: 09/530,961

(22) PCT Filed: Sep. 16, 1999

(86) PCT No.: PCT/FR99/02205

§ 371 Date: Sep. 12, 2000

§ 102(e) Date: Sep. 12, 2000

(87) PCT Pub. No.: WO00/17117

PCT Pub. Date: Mar. 30, 2000

(30) Foreign Application Priority Data

Sep. 17, 1998 (FR) .................................................. 98 11607

(51) Int. Cl.⁷ ...................................................... C03L 13/06
(52) U.S. Cl. ................... 501/36; 65/469; 65/470
(58) Field of Search .................... 501/35, 36; 65/459, 65/469, 470

(56) References Cited

U.S. PATENT DOCUMENTS

| | | | |
|---|---|---|---|
| 4,461,840 | * 7/1984 | Massol et al. | 501/36 |
| 5,250,488 | * 10/1993 | Thelohan et al. | 501/36 |
| 5,932,500 | * 8/1999 | Jensen et al. | 501/36 |
| 5,935,886 | * 8/1999 | Jensen et al. | 501/36 |
| 5,962,354 | * 10/1999 | Fyles et al. | 501/36 |
| 6,043,170 | * 3/2000 | Steinkopf et al. | 501/36 |
| 6,156,683 | * 12/2000 | Grove-Rasmussen et al. | 501/35 |

FOREIGN PATENT DOCUMENTS

| | | | |
|---|---|---|---|
| 19604238 | * | 8/1997 | (DE) . |
| 160196 | * | 2/1993 | (PL) . |
| 97/29057 | * | 8/1997 | (WO) . |
| 98/23547 | * | 6/1998 | (WO) . |

* cited by examiner

*Primary Examiner*—Karl Group
(74) *Attorney, Agent, or Firm*—Oblon, Spivak, McClelland, Maier & Neustadt, P.C.

(57) ABSTRACT

Mineral wool capable of dissolving in a physiological medium, which mineral wool comprises the constituents below in the following percentages by weight:

| | | | |
|---|---|---|---|
| $SiO_2$ | 39–55%, | preferably | 40–52% |
| $Al_2O_3$ | 16–27%, | " | 16–25% |
| $CaO$ | 3–35%, | " | 10–25% |
| $MgO$ | 0–15%, | " | 0–10% |
| $Na_2O$ | 0–15%, | " | 6–12% |
| $K_2O$ | 0–15%, | " | 3–12% |
| $R_2O\ (Na_2O + K_2O)$ | 10–17%, | " | 12–17% |
| $P_2O_5$ | 0–3%, | " | 0–2% |
| $Fe_2O_3$ | 0–15%, | | |
| $B_2O_3$ | 0–8%, | " | 0–4% |
| $TiO_2$ | 0–3%, | | | and in that MgO is between 0 and 5%, especially between 0 and 2%, when $R_2O \leq 13.0\%$.

28 Claims, No Drawings

MINERAL WOOL COMPOSITION

The present invention relates to the field of artificial mineral wools. It is aimed more particularly at mineral wools intended for manufacturing thermal and/or acoustic insulation materials or soilless-culture substrates.

It concerns more particularly mineral wools of the rock-wool type, that is to say the chemical compositions of which wools involve a high liquidus temperature and a high fluidity at their fiberizing temperature, combined with a high glass transition temperature.

Conventionally, this type of mineral wool is fiberized by so-called "external" centrifuging processes, for example of the type of those using a cascade of centrifuging wheels fed with molten material by a static delivery device, as described in particular in Patents EP-0,465,310 or EP-0,439,385.

The so-called "internal" centrifuging fiberizing process, that is to say that using centrifuges rotating at high speed and drilled with holes, is, on the other hand, conventionally reserved for fiberizing mineral wool of the glass-wool type, schematically having a composition richer in alkali metal oxides and having a low alumina content, a lower liquidus temperature and a higher viscosity at the fiberizing temperature than rock wool. This process is described, in particular, in Patents EP-0,189,354 and EP-0,519,797.

However, technical solutions have recently been developed which make it possible to adapt the internal centrifuging process to the fiberizing of rock wool, especially by modifying the composition of the constituent material of the centrifuges and their operating parameters. For further details on this subject, reference may be made especially to Patent WO 93/02977. This adaptation has proved to be particularly beneficial in the sense that it allows properties which hitherto were inherent in one or other of the two types of wool—rock wool or glass wool—to be combined. Thus, the rock wool obtained by internal centrifuging has a quality comparable to that of glass wool, with a lower content of unfiberized material than rock wool obtained conventionally. However, it retains the two major advantages associated with its chemical nature, namely a low chemicals cost and a high temperature withstand capability.

There are therefore now two possible ways of fiberizing rock wool, the choice of one or other depending on a number of criteria, including the quality level required for the intended application and the level of industrial and economic feasibility.

To these criteria have in recent years been added that of biodegradability of mineral wool, namely its ability to be rapidly dissolved in a physiological medium, so as to prevent any potential pathogenic risk associated with the possible accumulation of the finest fibres in the body by inhalation.

One solution to the problem of choosing the composition of a rock-type mineral wool having a biosoluble nature consists in the use of a high content of alumina and moderate alkali contents.

This solution results in particular in high raw materials costs because of the preferred use of bauxite.

The object of the present invention is to improve the chemical composition of rock-type mineral wools, the improvement being aimed especially at increasing their biodegradability with the ability for them to be fiberized especially and advantageously by internal centrifuging, while still maintaining the possibility of obtaining these compositions from inexpensive raw materials.

The subject of the invention is a mineral wool capable of dissolving in a physiological medium, which mineral wool comprises the constituents below in the following percentages by weight:

| | | | |
|---|---|---|---|
| $SiO_2$ | 39–55%, | preferably | 40–52% |
| $Al_2O_3$ | 16–27%, | " | 16–25% |
| CaO | 3–35%, | " | 10–25% |
| MgO | 0–15%, | " | 0–10% |
| $Na_2O$ | 0–15%, | " | 6–12% |
| $K_2O$ | 0–15%, | " | 3–12% |
| $R_2O$ ($Na_2O + K_2O$) | 10–17%, | " | 12–17% |
| $P_2O_5$ | 0–3%, | " | 0–2% |
| $Fe_2O_3$ | 0–15%, | | |
| $B_2O_3$ | 0–8%, | " | 0–4% |
| $TiO_2$ | 0–3%, | | | and in that MgO is between 0 and 5%, especially between 0 and 2%, when $R_2O \leq 13.0\%$.

According to an advantageous embodiment of the invention, the mineral wool comprises the constituents below in the following percentages by weight:

| | | | |
|---|---|---|---|
| $SiO_2$ | 39–55%, | preferably | 40–52% |
| $Al_2O_3$ | 16–25%, | " | 17–22% |
| CaO | 3–35%, | " | 10–25% |
| MgO | 0–15%, | " | 0–10% |
| $Na_2O$ | 0–15%, | " | 6–12% |
| $K_2O$ | 0–15%, | " | 6–12% |
| $R_2O$ ($Na_2O + K_2O$) | 13.0–17%, | | |
| $P_2O_5$ | 0–3%, | " | 0–2% |
| $Fe_2O_3$ | 0–15%, | | |
| $B_2O_3$ | 0–8%, | " | 0–4% |
| $TiO_2$ | 0–3%, | | |

In the rest of the text, any percentage of a constituent of the composition should be understood to mean a percentage by weight and the compositions according to the invention may include up to 2 or 3% of compounds to be considered as unanalysed impurities, as is known in this kind of composition.

The selection of such a composition has allowed a whole raft of advantages to be combined, especially by varying the many and complex roles that a number of these specific constituents play.

It has in fact been able to be shown that the combination of a high alumina content, of between 16 and 27%, preferably greater than 17% and/or preferably less than 25%, especially less than 22%, for a sum of network formers—silica and alumina—of between 57 and 75%, preferably greater than 60% and/or preferably less than 72%, especially less than 70%, with a high amount of alkalis ($R_2O$: soda and potash) of between 10 and 17%, with an MgO content of between 0 and 5%, especially between 0 and 2%, when $R_2O \leq 13.0\%$, makes it possible to obtain glass compositions having the remarkable property of being fiberizable over a very wide temperature range and of endowing the fibres obtained with biosolubility at acid pH. Depending on the embodiiments of the invention, the alkali content is preferably greater than 12%, especially greater than 13.0% and even 13.3%, and/or preferably less than 15%, especially less than 14.5%.

This range of compositions proves to be particularly beneficial as it has been able to be observed that, contrary to the received opinions, the viscosity of the molten glass does not drop significantly with increasing alkali content. This remarkable effect makes it possible to increase the difference between the temperature corresponding to the viscosity for fiberizing and the liquidus temperature of the phase which crystallizes, and thus to considerably improve the fiberizing conditions, and especially makes it possible to fiberize a new family of biosoluble glasses by internal centrifuging.

According to one embodiment of the invention, the compositions have iron oxide contents of between 0 and 5%, especially greater than 0.5% and/or less than 3%, especially less than 2.5%. Another embodiment is obtained with compositions which have iron oxide contents of between 5 and 12%, especially between 5 and 8%, which may allow mineral-wool blankets to exhibit fire resistance.

Advantageously, the compositions according to the invention satisfy the relationship:

$(Na_2O+K_2O)/Al_2O_3 \geq 0.5$, preferably $(Na_2O+K_2O)/Al_2O_3 \geq 0.6$, especially $(Na_2O+K_2O)/Al_2O_3 \geq 0.7$, which appears to favour the obtaining of a temperature corresponding to the viscosity for fiberizing which is greater than the liquidus temperature.

According to a variant of the invention, the compositions according to the invention preferably have a lime content of between 10 and 25%, especially greater than 12%, preferably greater than 15% and/or preferably less than 23%, especially less than 20%, and even less than 17%, combined with a magnesia content of between 0 and 5%, with preferably less than 2% magnesia, especially less than 1% magnesia and/or a magnesia content of greater than 0.3%, especially greater than 0.5%.

According to another variant, the magnesia content is between 5 and 10% for a lime content of between 5 and 15%, and preferably between 5 and 10%.

Adding $P_2O_5$, which is optional, at contents of between 0 and 3%, especially greater than 0.5% and/or less than 2%, may allow the biosolubility at neutral pH to be increased. Optionally, the composition may also contain boron oxide which may allow the thermal properties of the mineral wool to be improved, especially by tending to lower its coefficient of thermal conductivity in the radiative component and also to increase the biosolubility at neutral pH. Optionally, $TiO_2$ may also be included in the composition, for example up to 3%. Other oxides, such as BaO, SrO, MnO, $Cr_2O_3$ and $ZrO_2$, may be present in the composition, each up to contents of approximately 2%.

The difference between the temperature corresponding to a viscosity of $10^{2.6}$ poise (decipascal.second), denoted $T_{log\ 2.5}$, and the liquidus of the crystallizing phase, denoted $T_{liq}$, is preferably at least 10° C. This difference, $T_{log\ 2.5}-T_{liq}$, defines the "working range" of the compositions of the invention, that is to say the range of temperatures within which it is possible to fiberize, most particularly by internal centrifuging. This difference is preferably at least 20 or 30° C., and even more than 50° C., especially more than 100° C.

The compositions according to the invention have high glass transition temperatures, especially greater than 600° C. Their annealing temperature (denoted $T_{annealing}$) is especially greater than 600° C.

As mentioned above, the mineral wools have a satisfactory level of biosolubility, especially at acid pH. Thus, they generally have a rate of dissolution, especially measured with regard to silica, of at least 30 and preferably of at least 40 or 50 ng/cm² per hour measured at pH 4.5.

Another very important advantage of the invention concerns the possibility of using inexpensive raw materials for obtaining the composition of these glasses. These compositions may especially result from the melting of rocks, for example of the phonolite type, with an alkaline-earth carrier, for example limestone or dolomite, if necessary supplemented with iron ore. By this means, an alumina carrier of moderate cost is obtained.

This type of composition, having a high alumina content and a high alkali content, may be advantageously melted in fired or electric glass furnaces.

Further details and advantageous characteristics will emerge from the description below of non-limiting preferred embodiments.

Table 1 below gives the chemical compositions, in percentages by weight, of five examples.

When the sum of all the contents of all the compounds is slightly less or slightly greater than 100%, it should be understood that the difference from 100% corresponds to the unanalysed minority impurities/components and/or is due merely to the accepted approximation in this field in the analytical methods used.

TABLE 1

|  | EX.1 | EX. 2 | EX. 3 | EX. 4 | Ex. 5 |
| --- | --- | --- | --- | --- | --- |
| $SiO_2$ | 47.7 | 42.6 | 44.4 | 45.2 | 45.4 |
| $Al_2O_3$ | 18.6 | 18.1 | 17.3 | 17.2 | 18.1 |
| CaO | 6.2 | 22.7 | 21.7 | 15.3 | 13.5 |
| MgO | 7.1 | 0.2 | 0.4 | 0.5 | 0.5 |
| $Na_2O$ | 8.0 | 6.3 | 6.0 | 6.2 | 6.5 |
| $K_2O$ | 5.2 | 7.4 | 7.1 | 7.8 | 8.1 |
| $Fe_2O_3$ | 7.2 | 2.5 | 3 | 6.6 | 7.3 |
| TOTAL | 100 | 99.8 | 99.9 | 98.8 | 99.4 |
| $SiO_2 + Al_2O_3$ | 66.3 | 60.7 | 61.7 | 62.4 | 63.5 |
| $Na_2O + K_2O$ | 13.2 | 13.7 | 13.1 | 14 | 14.6 |
| $(Na_2O + K_2O)/Al_2O_3$ | 0.71 | 0.76 | 0.76 | 0.81 | 0.81 |
| $T_{log\ 2.5}$ | 1293° C. | 1239° C. | 1230° C. | 1248° C. | 1280° C. |
| $T_{liq}$ | 1260° C. | 1200° C. | 1190° C. | 1160° C. | 1160° C. |
| $T_{log\ 2.5} - T_{liq}$ | +33° C. | +39° C. | +40° C. | +88° C. | +120° C. |
| $T_{annealing}$ | 622° C. | 658° C. |  | 634° C. | 631° C. |
| Dissolution rate at pH = 4.5 | ≥30 ng/cm² per h | ≥30 ng/cm² per h | ≥30 ng/cm² per h | 107 ng/cm² per h | 107 ng/cm² per h |

The compositions according to these examples were fiberized by internal centrifuging, especially according to the teaching of the aforementioned Patent WO 93/02977.

The working ranges, defined by the difference $T_{log\ 2.5}-T_{liq}$, are largely positive. All have a $(Na_2O+K_2O)/Al_2O_3$ ratio of greater than 0.7 for a high alumina content of approximately 17 to 20%, with quite a high $(SiO_2+Al_2O_3)$ sum and an alkali content of at least 13.0%.

Examples of additional compositions according to the invention (referred to as Ex. 6 to Ex. 40) have proved to be beneficial and are given in Table 2.

All have a $(Na_2O+K_2O)/Al_2O_3$ ratio of greater than 0.5, especially greater than 0.6, even greater than 0.7.

The alumina content is high, between 17% and more than 25%, with a quite high $(SiO_2+Al_2O_3)$ sum, especially greater than 60%.

The alcali content of the additional compositions is especially between less than 11.5% and more than 14%.

It should be noted that their working ranges are largely positive, especially greater than 50° C., indeed greater than 100° C. and even greater than 150° C.

The liquidus temperatures are not very high, especially less than or equal to 1200° C. and even 1150° C.

The temperatures ($T_{log\ 2.5}$) corresponding to viscosities of $10^{2.5}$ poise are compatible with the use of high-temperature fiberizing dishes, especially under the conditions of use that are described in Application WO93/02977.

The preferred compositions are especially those in which $T_{log\ 2.5}$ is less than 1350° C., preferably less than 1300° C.

It has been able to be shown that for compositions comprising between 0 and 5% magnesia MgO, especially with at least 0.5% of MgO and/or less than 2%, or even less than 1%, of MgO and between 10 and 13% of alkalis, very satisfactory values of physical properties, especially working ranges and rate of dissolution, are obtained (in the Case of examples: Ex. 18, Ex. 31, Ex. 32, Ex. 33 and ex. 35 to Ex. 40).

It should be noted that their Annealing temperatures are especially greater than 600° C., even greater than 620° C., and even greater than 630° C.

TABLE 2

| | EX. 6 | EX. 7 | EX. 8 | EX. 9 | EX. 10 | EX. 11 | EX. 12 | EX. 13 | EX. 14 | EX. 15 |
|---|---|---|---|---|---|---|---|---|---|---|
| $SiO_2$ | 43.9 | 44.2 | 43.8 | 46.1 | 43.8 | 47.1 | 41.9 | 48.2 | 43.2 | 46.3 |
| $Al_2O_3$ | 17.6 | 17.6 | 17.6 | 17.4 | 17.6 | 15.7 | 20.9 | 19.8 | 22.5 | 19.3 |
| CaO | 15 | 13.3 | 14.2 | 13.2 | 11.9 | 9.8 | 14.5 | 14 | 14.3 | 13.9 |
| MgO | 0.5 | 0.5 | 0.5 | 0.5 | 0.5 | 0.4 | 0.5 | 0.5 | 0.5 | 0.5 |
| $Na_2O$ | 6.40 | 6.3 | 6.4 | 6.3 | 6.4 | 6.4 | 6.1 | 6 | 6 | 6 |
| $K_2O$ | 7.6 | 7.9 | 7.9 | 7.8 | 8.0 | 8.0 | 7.4 | 7.2 | 7.1 | 7.1 |
| $Fe_2O_3$ | 8.4 | 9.8 | 9.2 | 8.3 | 11.3 | 12.1 | 8.7 | 4.2 | 6.3 | 6.8 |
| TOTAL | 99.4 | 99.6 | 99.6 | 99.6 | 99.5 | 99.5 | 100 | 99.9 | 99.9 | 99.9 |
| $SiO_2 + Al_2O_3$ | 61.5 | 61.8 | 61.4 | 63.5 | 61.4 | 62.8 | 62.8 | 68 | 65.7 | 65.6 |
| $Na_2O + K_2O$ | 14.2 | 14.2 | 14.3 | 14.1 | 14.4 | 14.4 | 13.5 | 13.2 | 13.1 | 13.1 |
| $(Na_2O + K_2O)/Al_2O_3$ | 0.81 | 0.81 | 0.81 | 0.81 | 0.81 | 0.92 | 0.65 | 0.67 | 0.58 | 0.66 |
| $T_{log\ 2.5+}$ (in ° C.) | 1270 | 1285 | 1275 | 1310 | 1295 | 1305 | 1300 | 1380 | 1345 | 1335 |
| $T_{liq}$ (in ° C.) | 1120 | 1100 | 1110 | 1140 | 1160 | 1200 | 1140 | 1160 | 1140 | 1110 |
| $T_{log\ 2.5} - T_{liq}$ (in ° C.) | 150 | 185 | 165 | 170 | 135 | 105 | 160 | 220 | 205 | 225 |
| $T_{annealing}$ (in ° C.) | 618 | | | | 615 | 616 | 635 | 654 | 655 | 645 |
| Dissolution rate at pH = 4.5 (in $ng/cm^2$ per hour) | 45 | ≧30 | ≧30 | ≧30 | 60 | >30 | ≧30 | ≧30 | ≧30 | ≧30 |

| | EX. 16 | EX. 17 | EX. 18 | EX. 19 | EX. 20 | EX. 21 | EX. 22 | EX. 23 | EX. 24 | EX. 25 |
|---|---|---|---|---|---|---|---|---|---|---|
| $SiO_2$ | 45.4 | 43 | 44.3 | 43 | 47.7 | 45.6 | 43.5 | 43.1 | 40.3 | 42.3 |
| $Al_2O_3$ | 18.8 | 19.7 | 19.8 | 21.5 | 18.4 | 22.4 | 21.2 | 22.2 | 25.1 | 21.7 |
| CaO | 13.9 | 14.1 | 13.4 | 14.1 | 13.8 | 13.9 | 14.1 | 14 | 13.9 | 13.1 |
| MgO | 0.5 | 0.5 | 0.7 | 0.5 | 0.5 | 0.5 | 0.5 | 0.5 | 0.5 | 0.6 |
| $Na_2O$ | 5.9 | 6 | 8.3 | 6 | 6 | 6 | 6 | 6 | 6 | 5.9 |
| $K_2O$ | 7.2 | 7.2 | 3.7 | 7.3 | 7.3 | 7.3 | 7.2 | 7.2 | 7.2 | 7.7 |
| $Fe_2O_3$ | 8.3 | 9.5 | 9.3 | 7.5 | 6.2 | 4.2 | 7.4 | 6.9 | 6.9 | 8.7 |
| TOTAL | 100 | 100 | 99.5 | 99.8 | 99.9 | 99.9 | 99.9 | 99.9 | 99.9 | 100 |
| $SiO_2 + Al_2O_3$ | 64.2 | 62.7 | 63.8 | 64.5 | 66.1 | 68 | 64.7 | 65.3 | 65.4 | 64.0 |
| $Na_2O + K_2O$ | 13.1 | 13.2 | 12 | 13.3 | 13.3 | 13.3 | 13.2 | 13.2 | 13.2 | 13.6 |
| $(Na_2O + K_2O)/Al_2O_3$ | 0.7 | 0.67 | 0.61 | 0.62 | 0.72 | 0.59 | 0.62 | 0.59 | 0.53 | 0.63 |
| $T_{log\ 2.5+}$ (in ° C.) | 1315 | 1305 | 1250 | 1325 | 1345 | 1370 | 1325 | 1335 | 1330 | 1300 |
| $T_{liq}$ (in ° C.) | 1110 | 1110 | 1170 | 1140 | 1150 | 1150 | 1120 | 1160 | 1170 | 1160 |
| $T_{log\ 2.5} - T_{liq}$ (in ° C.) | 205 | 195 | 80 | 175 | 195 | 220 | 205 | 175 | 160 | 140 |
| $T_{annealing}$ (in ° C.) | 637 | 638 | | 644 | 645 | 658 | 644 | 650 | 652 | |
| Dissolution rate at pH = 4.5 (in $ng/cm^2$ per hour) | ≧30 | ≧30 | ≧30 | ≧30 | ≧30 | >30 | ≧30 | ≧30 | ≧30 | ≧30 |

| | EX. 26 | EX. 27 | EX. 28 | EX. 29 | EX. 30 | EX. 31 | EX. 32 | EX. 33 | EX. 34 |
|---|---|---|---|---|---|---|---|---|---|
| $SiO_2$ | 43.9 | 41.5 | 39.3 | 47.3 | 45.3 | 45.3 | 44 | 46.5 | 46.5 |
| $Al_2O_3$ | 24.6 | 24.7 | 24.9 | 18.2 | 19.2 | 20.5 | 22.5 | 19.2 | 19.5 |
| CaO | 13.2 | 13.4 | 13.3 | 13.9 | 12.9 | 12.9 | 12.7 | 12.4 | 11.5 |
| MgO | 0.6 | 0.6 | 0.5 | 0.6 | 0.8 | 0.8 | 0.8 | 0.8 | 0.7 |
| $Na_2O$ | 5.9 | 6.2 | 6.3 | 8.1 | 7.9 | 8.3 | 7.9 | 8.8 | 8.4 |
| $K_2O$ | 7.6 | 7.6 | 7.6 | 3.9 | 5.7 | 3.8 | 3.7 | 3.9 | 5 |
| $Fe_2O_3$ | 4 | 6 | 8.1 | 7.5 | 7.5 | 7.4 | 7.5 | 7.4 | 7.5 |
| TOTAL | 99.8 | 100 | 100 | 99.5 | 99.3 | 99 | 99.1 | 99 | 99.1 |
| $SiO_2 + Al_2O_3$ | 68.5 | 66.2 | 64.2 | 65.5 | 64.5 | 65.8 | 66.5 | 65.7 | 66 |
| $Na_2O + K_2O$ | 13.5 | 12.8 | 13.9 | 11.9 | 13.6 | 12.1 | 11.6 | 12.7 | 13.4 |
| $(Na_2O + K_2O)/Al_2O_3$ | 0.55 | 0.52 | 0.56 | 0.65 | 0.7 | 0.59 | 0.52 | 0.66 | 0.69 |
| $T_{log\ 2.5+}$ (in ° C.) | 1370 | 1330 | 1295 | 1270 | 1270 | 1280 | 1285 | 1280 | 1295 |
| $T_{liq}$ (in ° C.) | | 1180 | 1200 | 1160 | 1150 | 1180 | 1200 | 1150 | 1170 |
| $T_{log\ 2.5} - T_{liq}$ | | 150 | 95 | 110 | 120 | 100 | 85 | 130 | 125 |

TABLE 2-continued

| (in °C.) | | | | | | | | | |
|---|---|---|---|---|---|---|---|---|---|
| $T_{annealing}$ (in °C.) | | | | | 625 | | | 618 | 619 |
| Dissolution rate at pH = 4.5 (in ng/cm² per hour) | ≧30 | ≧30 | ≧30 | ≧30 | ≧30 | >30 | ≧30 | ≧30 | ≧30 |

| | EX. 35 | EX. 36 | EX. 37 | EX. 38 | EX. 39 | EX. 40 |
|---|---|---|---|---|---|---|
| $SiO_2$ | 47.7 | 46.5 | 48.0 | 47.1 | 46 | 46 |
| $Al_2O_3$ | 18.9 | 19.5 | 19.2 | 21 | 20.5 | 20.1 |
| CaO | 13.6 | 14.4 | 13.6 | 12.6 | 11.6 | 14.4 |
| MgO | 1.4 | 1.4 | 0.7 | 0.7 | 0.7 | 1.1 |
| $Na_2O$ | 7.4 | 7.3 | 7.4 | 7.2 | 7.4 | 7.1 |
| $K_2O$ | 5 | 5 | 5 | 5 | 5 | 5 |
| $Fe_2O_3$ | 4.8 | 4.9 | 4.9 | 4.9 | 7.3 | 4.9 |
| TOTAL | 99.8 | 99 | 98.8 | 98.5 | 98.5 | 98.6 |
| $SiO_2 + Al_2O_3$ | 66.6 | 66.0 | 67.2 | 68.1 | 66.5 | 66.1 |
| $Na_2O + K_2O$ | 0.66 | 12.3 | 12.4 | 12.2 | 12.4 | 12.1 |
| $(Na_2O + K_2O)/Al_2O_3$ | 0.66 | 0.63 | 0.65 | 0.53 | 0.6 | 0.6 |
| $T_{log\ 2.5+}$ (in °C.) | 1310 | 1295 | 1315 | 1340 | 1320 | 1300 |
| $T_{liq}$ (in °C.) | 1140 | 1150 | 1120 | 1110 | 1120 | 1140 |
| $T_{log\ 2.5} - T_{liq}$ (in °C.) | 170 | 145 | 195 | 230 | 200 | 160 |
| $T_{annealing}$ (in °C.) | 636 | 636 | 640 | 643 | 633 | 641 |
| Dissolution rate at pH = 4.5 (in ng/cm² per hour) | ≧30 | ≧30 | ≧30 | ≧30 | ≧30 | ≧30 |

What is claimed is:

1. A mineral wool capable of dissolving in a physiological medium, comprising the constituents:

39 to 55% by weight $SiO_2$,
16 to 27% by weight $Al_2O_3$,
3 to 35% by weight CaO,
0 to 15% by weight MgO,
0 to 15% by weight $Na_2O$,
0 to 15% by weight $K_2O$,
10 to 17% by weight $R_2O(Na_2O+K_2O)$,
0 to 3% by weight $P_2O_5$,
0 to 15% by weight $Fe_2O_3$,
0 to 8% by weight $B_2O_3$, and
0 to 3% by weight $TiO_2$, wherein
MgO is between 0 and 5% when $R_2O \leq 13.0\%$.

2. The mineral wool of claim 1, wherein the constituents are in amount of 40 to 52% by weight $SiO_2$, 16 to 25% by weight $Al_2O_3$, 10 to 25% by weight CaO, 0 to 10% by weight MgO, 6 to 12% by weight $Na_2O$, 3 to 12% by weight $K_2O$, 12 to 17% by weight $R_2O(Na_2O+K_2O)$, 0 to 2% by weight $P_2O_5$, 0 to 15% by weight $Fe_2O_3$, 0 to 4% by weight $B_2O_3$, and 0 to 3% by weight of $TiO_2$.

3. The mineral wool of claim 1, wherein MgO is in amount of 0 to 5% by weight.

4. The mineral wool of claim 1, wherein $R_2O \leq 13.0\%$ by weight and MgO is in an amount of 0 to 2%.

5. The mineral wool of claim 1, wherein the constituents are in amount of 40 to 52% by weight $SiO_2$, 16 to 25% by weight $Al_2O_3$, 3 to 35% by weight CaO, 0 to 15% by weight MgO, 0 to 15% by weight $Na_2O$, 0 to 15% by weight $K_2O$, 13.0 to 17% by weight $R_2O(Na_2O+K_2O)$, 0 to 3% by weight $P_2O_5$, 0 to 15% by weight $Fe_2O_3$, 0 to 8% by weight $B_2O_3$, and 0 to 3% by weight of $TiO_2$.

6. The mineral wool of claim 5, wherein the constituents are in amount of 40 to 52% by weight $SiO_2$, 17 to 22% by weight $Al_2O_3$, 10 to 25% by weight CaO, 0 to 10% by weight MgO, 6 to 12% by weight $Na_2O$, 6 to 12% by weight $K_2O$, 13.0 to 17% by weight $R_2O(Na_2O+K_2O)$, 0 to 2% by weight $P_2O_5$, 0 to 15% by weight $Fe_2O_3$, 0 to 4% by weight $B_2O_3$, and 0 to 3% by weight of $TiO_2$.

7. The mineral wool of claim 1, wherein $R_2O$ is in an amount from 13.0 to 15.0% by weight.

8. The mineral wool of claim 7, wherein $R_2O$ is in an amount from 13.3 to 14.5% by weight.

9. The mineral wool of claim 1, wherein $Fe_2O_3$ is in an amount from 0 to 5% by weight.

10. The mineral wool of claim 9, wherein $Fe_2O_3$ is in an amount from 0 to 3% by weight.

11. The mineral wool of claim 9, wherein $Fe_2O_3$ is in an amount from 0 to 2.5% by weight.

12. The mineral wool of claim 11, wherein $Fe_2O_3$ is in an amount from 5 to 15% by weight.

13. The mineral wool of claim 12, wherein $Fe_2O_3$ is in an amount from 5 to 8% by weight.

14. The mineral wool of claim 1, wherein the weight ratio $(Na_2O+K_2O)/Al_2O_3 \geq 0.5$.

15. The mineral wool of claim 1, wherein the weight ratio $(Na_2O+K_2O)/Al_2O_3 \geq 0.6$.

16. The mineral wool of claim 15, wherein the weight ratio $(Na_2O+K_2O)/Al_2O_3 \geq 0.7$.

17. The mineral wool of claim 1, wherein CaO is in amount from 10 to 25% by weight and MgO is in an amount from 0 to 5% by weight.

18. The mineral wool of claim 17, wherein CaO is in amount from 15 to 25% by weight and MgO is in an amount from 0 to 2% by weight.

19. The mineral wool of claim 18, wherein MgO is in an amount from 0 to 1% by weight.

20. The mineral wool of claim 1, wherein the MgO is in an amount from 5 to 10% by weight and CaO is in an amount from 5 to 15% by weight.

21. The mineral wool of claim 20, wherein CaO is in an amount from 5 to 10% by weight.

22. The mineral wool of claim 1, wherein the mineral wool has a rate of dissolution of at least 30 ng/cm² per hour measured at pH 4.5.

23. A method of making a mineral wool, the method comprising fiberizing a glass produced by melting raw materials and an alkaline-earth carrier; and forming the mineral wool of claim 1.

24. The method of claim 23, wherein said raw materials are rocks.

25. The method of claim 24, wherein said rocks are phonolite.

26. The method of claim 23, wherein said alkaline-earth carrier is limestone or dolomite.

27. The method of claim 25, further comprising melting iron ore with the raw materials and the alkaline-earth carrier.

28. The method of claim 22, wherein said fiberizing a glass comprises internal centrifuging.

* * * * *